United States Patent [19]

Clarke et al.

[11] Patent Number: 4,948,447

[45] Date of Patent: Aug. 14, 1990

[54] METHOD OF MANUFACTURING LIGHTWEIGHT COMPOSITE GLASS-PLASTIC LENSES

[75] Inventors: Louis G. Clarke, Hopewell; Clifford G. Gruschow, Petersburg, both of Va.

[73] Assignee: BCGS, Inc., Charlotte, N.C.

[21] Appl. No.: 312,181

[22] Filed: Feb. 21, 1989

[51] Int. Cl.$^5$ ............................................. B32B 31/12
[52] U.S. Cl. ............................... 156/273.3; 156/272.2; 156/99; 156/275.7; 264/1.4; 264/1.7; 351/177
[58] Field of Search ............... 156/272.8, 273.3, 275.7, 156/273.5, 99, 275.3, 272.2; 351/177, 166; 264/1.4, 2.6, 1.7, 2.3; 522/903, 150, 178, 121; 350/320

[56] References Cited

U.S. PATENT DOCUMENTS

| | | | |
|---|---|---|---|
| 3,867,222 | 2/1975 | Plant et al. | 427/54.1 X |
| 4,679,918 | 7/1987 | Ace | 351/177 X |
| 4,800,123 | 1/1989 | Boeckeler | 350/409 X |
| 4,822,451 | 4/1989 | Ouderkirk et al. | 156/272.2 X |

FOREIGN PATENT DOCUMENTS 8607568 12/1986 PCT Int'l Appl. ............. 156/272.8

*Primary Examiner*—Michael W. Ball
*Assistant Examiner*—Michele K. Yoder
*Attorney, Agent, or Firm*—John J. Byrne

[57] ABSTRACT

A process and product for the manufacture of a composite plastic lens wherein the plastic lens component is subjected to ultraviolet rays under conditions to eliminate substantially any unreacted double bonds therein.

5 Claims, No Drawings

METHOD OF MANUFACTURING LIGHTWEIGHT COMPOSITE GLASS-PLASTIC LENSES

BACKGROUND OF THE INVENTION

This invention is in the field of glass-plastic composites and more specifically relates to the production of high quality glass-plastic ophpthalmic lenses which, if desired, can provide photochromic properties.

The two primary advantages that plastic lenses have over glass lenses are those of lightness and tintability. Likewise, there are two primary advantages which glass lenses have over plastic; namely, glass is scratch resistant and can readily be given photochromic properties.

The mechanical durability of thin-glass-plastic composites is limited because of the expansion differences of the two components during temperature changes. This has long been recognized as a major problem in creating a successful composite. The mechanical stresses created by this expansion mismatch during periods of temperature changes causes glass breakage or delamination from the plastic. The coefficient of expansion of most glasses is below $9 \times 10\text{-}6/C$ whereas the coefficient of expansion of most plastic lenses are in the neighborhood of $100 \times 10\text{-}6/C$. Additionally, the choice of adhesives between components is critical.

Burkley, in U.S. Pat. No. 3,508,987 (1970) discloses the utilization of elastomeric adhesive compounds between glass and plastic components that will accommodate the different expansion rates. Burkley, as in this invention, uses uniformly spaced components. In Burkley, the spacing is 0.3 to 0.4 mm. Ace, in U.S. Pat. No. 4,679,918, discloses an adhesive layer between a thin glass layer and an allyl diglycol carbonate layer to overcome an expansion mismatch during periods of reasonable temperature excursions ($-40°$ F. to $212°$ F.). Sypcher, in U.S. Pat. No. 4,227,950 discloses a method of direct casting of allyl diglycol carbonate resin (ADC) onto a thin glass photochromic lens containing a uniform thermoplastic adhesive coating approximately 0.2 mm thick and, after curing the ADC, increasing the temperature above the melting point of the thermoplastic coating to adhere the elements together.

Another characteristic of glass is that it exhibits high resistance to fracture under compression stress, but a relatively low resistance to fracture under a tensile stress. As taught by Gulanti in U.S. Pat. No. 4,268,134 stresses in a glass layer at the edge of a glass-plastic composite lens consist of a meridianal force and a bending moment. The bending moment tends to fracture the glass layer near the lens edge.

Specifically, patent '918 uses an RTU silicone compound with elongation of 100% or greater and the specific examples given being 400% with a uniform thickness adhesive layer of 0.30 to 0.4 mm. The adhesive listed, UUU23-10, has a Shore A hardness of 20. It has been empirically determined that for an adhesive layer to be efficiently edged on conventional equipment at this thickness, a hardness of at least 69 Shore D is desirable. This is in order of magnitude much greater than a Shore A of 20. This lack of hardness presents a burden on production of such lenses. Skilled craftsmen are necessary to produce such lenses.

The prior art, therefore, has not found a completely satisfactory answer to bonding a thin glass lens to a plastic lens. Burkley and Ace have disclosed the use of a highly elastic bonding material that will move with the plastic lenses in periods of extreme temperature changes, but, in so doing, have created other problems that limits the use of such products. Spycher and Gulanti, although recognizing the problems, failed to rectify the problem in their respective approaches.

SUMMARY OF THE INVENTION

A principal objective of this invention is to provide glass-plastic lens laminations that will approach the ease of production now found in glass-to-glass or plastic-to-plastic laminations.

Another objective is to provide a composite lens that can be readily manufactured as either a semi-finished or finished product and because of its ease of fabrication, can be marketed through normal wholesale channels or directly to retail channels.

It is also an important objective of this invention to provide a lens and method of manufacture that will comply with or exceed governmental standards. According to federal government regulations, all lenses must pass a drop ball test for impact resistance. To meet these requirements, many manufacturers have modified their formulations by adding co-polymers and plastisizers. In many instances, such additions to the basic CR-39 formula compounds, aggravate the problem of glass-plastic laminations. Even lenses produced out of pure CR-39 must meet the above-mentioned requirements.

Another important objective of the invention is to provide a composite lens that is capable of being efficiently ground, polished and edged.

The product of this invention also has as one of its objectives, a product that will tint rapidly for sunwear and one that is clear. The latter is sometimes referred to as "water white". When present day off-the-shelf plastic lenses are tested for expansion from room temperature ($72°$ F.) to boiling water ($212°$ F.) measurements of radii changes from 2.0 to 2.6 mm can be noted. Also, measurements taken on 65 mm size lenses, exhibit an increase in size of 0.4 to 0.5 mm. This causes the so-called "catastrophic" failures in glass-to-plastic laminations. The changes in dimension take place at the plastic lens to bonding material interface.

DESCRIPTION OF THE PREFERRED EMBODIMENT

In the glass-plastic laminate of this invention, a glass layer from 0.8 to 1.5 mm is selected but is chemically hardened. The adhesive layer preferred is EP-37-2 epoxy, from Master Bond Inc., and is 0.08 to 0.20 mm thick. It is important to note that any of the above preferred thicknesses will pass the U.S. drop ball requirements without the plastic lens being attached.

It has been found that when a CR-39 lens of the off-the-shelf variety is ground to a fine powder and extracted, the presence of many unreacted double bonds can be detected. This being revealed, and realizing the requirements of manufacturers to meet the drop ball requirements and to maintain fast tintability and yellow-free lenses, experiments were conducted to fully cure and/or over-cure a lens. Shelf lenses were initially used and were overcured or aged in the presence of high intensity UV radiation plus heat at $215°$ F. A 1,000 watt mercury vapor lamp was used and the plastic components were placed about 15 inches therefrom and were allowed to remain there for 15 minutes. After such treatment, the coefficient of expansion of the sample lenses were dramatic when compared with the same lenses before treatment. The results tabulated in Table 2 demonstrate that 40% of the expansion due to temperature changes (−40° F. to 212° F.) is eliminated after 15 minutes exposure to the UV radiation and heat. The treated lenses yellowed to a degree but not to a point objectionable in a photochromic glass-plastic laminate. The color actually blended with the color of photochromi glass in its unreacted state. Further exposure of the lenses to the UV radiation and heat disclosed no additional color change. When the treated lenses were ground to a fine powder, unreacted double bonds were not present.

Four of the treated lenses, one each of 2.00, 4.25, 6.25 and 8.25 diopter base curves were laminated to matching curvatures of PhotoGray Extra Glass which had previously been chemically hardened using the process of this invention. The adhesive for this test was Locktite #34931, a UV-curable compound which has a Barcol Hardness of 25 (approximately same as a CR-39 lens). The liquid adhesive was placed on the concave side of the glass lenses and the CR-39 lenses, with matching convex curves, were pressed to the glass lens and adhesive until an even, thin layer of adhesive of approximately 0.004" was obtained. The lenses were placed under UV curing lamps to harden the adhesive. The treated lenses were then generated, fined and polished to finished prescriptions appropriate for each base curve. (See data table). Samples were next placed in a freezer for 24 hours at (−40° F.), removed and placed directly in boiling water (212° F.) for 1 hour. After removal from the water bath each lens was inspected for glass fracture upon removal from the freezer. All samples passed final inspection. There was no breakage.

The same procedure as above was repeated without the UV radiation and heat treatment. One of these samples exhibited glass fracture upon removal from the freezer. The other three samples had glass breakage within 30 seconds of immersion in boiling water.

Hiri lenses (High Index Material by PPG Industries) from two manufacturers were also treated with the UV radiation and heat and similar results were tabulated as had been found with the CR-39 treated samples. (See data table). Upon lamination with the thin glass elements untreated lenses failed in the boiling water bath while all of the treated samples passed both the boiling water and freezer tests. The following Tables illustrate the results.

TABLE I

Comparison of CR-39, Treated Lens

| | CR-39 | | | Treated CR-39 | | |
|---|---|---|---|---|---|---|
| | 2.00 Base | | | 3.00 Diopter CC Curve 2.00 CT 65 MM Diameter | | |
| | Cold | Boil | DIA CG | Cold | Boil | DIA CG |
| 2.00 | 64.01 | 64.47 | 0.46 | 64.22 | 64.47 | 0.25 |
| | 64.03 | 64.51 | 0.48 | 64.23 | 64.51 | 0.28 |
| | 64.01 | 64.48 | 0.47 | 64.23 | 64.49 | 0.26 |
| | 64.01 | 64.47 | 0.46 | 64.21 | 64.47 | 0.26 |
| Average | | | 0.47 mm | | | 0.26 mm |
| % Difference From CR-39 | | | | | | 0.45% |

| | 4.25 Base | | | 6.00 Diopter CC Curve 2.00 CT 65 MM Diameter | | |
|---|---|---|---|---|---|---|
| | Cold | Boil | DIA CG | Cold | Boil | DIA CG |
| 4.25 | 63.77 | 64.18 | 0.41 | 64.21 | | 0.23 |
| | 63.77 | 64.18 | 0.41 | 64.21 | | 0.23 |
| | 63.80 | 64.18 | 0.38 | 64.23 | | 0.22 |
| | 63.80 | 64.23 | 0.43 | 64.22 | | 0.24 |

TABLE I-continued

Comparison of CR-39, Treated Lens

| | CR-39 | | | Treated CR-39 | | |
|---|---|---|---|---|---|---|
| Average | | | 0.41 mm | | | 0.23 mm |
| % Difference From CR-39 | | | | | | 0.44% |

| | 6.25 Base | | | 7.12 Diopter CC Curve 2.00 CT 65 MM Diameter | | |
|---|---|---|---|---|---|---|
| | Cold | Boil | DIA CG | Cold | Boil | DIA CG |
| 6.25 | 64.98 | 65.29 | 0.39 | 64.36 | 64.55 | 0.19 |
| | 64.97 | 65.29 | 0.42 | 64.36 | 64.59 | 0.23 |
| | 64.87 | 65.29 | 0.40 | 64.36 | 64.59 | 0.23 |
| | 64.88 | 65.27 | 0.39 | 64.43 | 64.66 | 0.23 |
| Average | | | 0.39 mm | | | 0.23 mm |
| % Difference From CR-39 | | | | | | 0.41% |

| | 8.25 Base | | | 6.25 Diopter CC Curve 4.25 CT 65 MM Diameter | | |
|---|---|---|---|---|---|---|
| | Cold | Boil | DIA CG | Cold | Boil | DIA CG |
| 8.25 | 64.43 | 64.85 | 0.43 | 64.02 | 64.28 | 0.26 |
| | 64.45 | 64.89 | 0.44 | 64.04 | 64.33 | 0.29 |
| | 64.42 | 64.89 | 0.47 | 64.05 | 64.33 | 0.28 |
| | 64.46 | 64.89 | 0.43 | 64.10 | 64.30 | 0.20 |

TABLE II

Comparison of CR-39, Treated Lens

| Average | 0.44 | 0.25 |
|---|---|---|
| % Difference From CR-39 | | 0.43% |

Cold is at 22 F.
Boiling is at 212 F.

TABLE III

Comparison of Hiri, Treated Lens

| | Hiri | | | Treated | | |
|---|---|---|---|---|---|---|
| | 2.00 Base | | | 3.00 Diopter CC Curve 2.00 CT 65 MM Diameter | | |
| | Cold | Boil | DIA CG | Cold | Boil | DIA CG |
| 2.00 | 64.66 | 65.17 | 0.51 | 64.32 | 64.56 | 0.24 |
| | 64.68 | 65.21 | 0.53 | 64.33 | 64.61 | 0.28 |
| | 64.68 | 65.20 | 0.52 | 64.33 | 64.58 | 0.25 |
| | 64.65 | 65.16 | 0.51 | 64.31 | 64.55 | 0.24 |
| Average | | | 0.52 mm | | | 0.25 mm |
| % Difference From CR-39 | | | | | | 0.52% |

| | 4.25 Base | | | 6.00 Diopter CC Curve 2.00 CT 65 MM Diameter | | |
|---|---|---|---|---|---|---|
| | Cold | Boil | DIA CG | Cold | Boil | DIA CG |
| 4.25 | 64.28 | 64.72 | 0.44 | 64.37 | 64.62 | 0.25 |
| | 64.26 | 64.74 | 0.48 | 64.37 | 64.61 | 0.24 |
| | 64.27 | 64.74 | 0.47 | 64.37 | 64.61 | 0.24 |
| | 64.27 | 64.73 | 0.46 | 64.35 | 64.58 | 0.23 |
| Average | | | 0.41 mm | | | 0.24 mm |
| % Difference From CR-39 | | | | | | 0.48% |

| | 6.25 Base | | | 7.12 Diopter CC Curve 2.00 CT 65 MM Diameter | | |
|---|---|---|---|---|---|---|
| | Cold | Boil | DIA CG | Cold | Boil | DIA CG |
| 6.25 | 64.76 | 65.19 | 0.43 | 64.26 | 64.48 | 0.22 |
| | 64.78 | 65.19 | 0.41 | 64.26 | 64.50 | 0.24 |
| | 64.74 | 65.15 | 0.41 | 64.25 | 64.46 | 0.21 |
| | 64.74 | 65.17 | 0.43 | 64.23 | 64.44 | 0.21 |
| Average | | | 0.42 mm | | | 0.22 mm |
| % Difference From CR-39 | | | | | | 0.48% |

TABLE IV

| | Comparison of Hiri, Treated Lens | | | | | |
|---|---|---|---|---|---|---|
| | Cold | Boil | DIA CG | Cold | Boil | DIA CG |
| 8.25 | 64.16 | 64.62 | 0.46 | 64.21 | 64.42 | 0.21 |
| | 64.16 | 64.64 | 0.48 | 64.24 | 64.48 | 0.24 |
| | 64.16 | 64.64 | 0.48 | 64.21 | 64.48 | 0.27 |
| | 64.20 | 64.65 | 0.45 | 64.22 | 64.49 | 0.27 |
| Average | | | 0.47 mm | | | 0.25 mm |
| % Difference From CR-39 | | | | | | 0.47% |
| Cold is at 22 F. | | | | | | |
| Boiling is at 212 F. | | | | | | |

In a general manner, while there have been disclosed a preferred embodiment of the invention, it should be understood that the invention is not limited to such an embodiment as there may be changes made in the arrangement, disposition and location of the parts without departing from the principle of the present invention as comprehended within the scope of the accompanying claims.

We claim:

1. The process of manufacturing a composite plastic-glass lens having a glass component and a plastic lens component that contains unreacted double bonds comprising the steps of
    subjecting said plastic lens component to ultraviolet rays for a time and temperature duration sufficient to eliminate said unreacted double bonds and to reduce its thermal coefficient of expansion; and
    subsequently adhering said glass lens component to said plastic lens component.

2. The method of claim 1 wherein said glass lens component is photochromatic and is formed by a front convex surface and a rear concave surface.

3. The method of claim 1 wherein an adhesive having a shore D Hardness of approximately 69, is used for said adhering.

4. The method of claim 1 wherein said plastic lens component has a convex surface of the same curvature as said concave surface of said plastic lens component and said surfaces are secured to each other by said adhering step.

5. The method of claim 1 wherein said step of subjecting the plastic lens component to ultraviolet rays is accomplished by exposing said plastic lens to a 1,000 watt mercury vapor lamp for approximately 15 minutes at a distance of approximately 15 inches.

* * * * *